United States Patent [19]

Siems

[11] Patent Number: 5,550,708

[45] Date of Patent: Aug. 27, 1996

[54] REMOTE ACCESS DISCONNECT AND FUSING ARRANGEMENT

[76] Inventor: Steven L. Siems, 1491 SW. 21st Ave., Ft. Lauderdale, Fla. 33314

[21] Appl. No.: 376,807

[22] Filed: Jan. 23, 1995

Related U.S. Application Data

[63] Continuation-in-part of Ser. No. 1,502, Jan. 6, 1993, abandoned.

[51] Int. Cl.$^6$ ....................................... H02B 1/04
[52] U.S. Cl. .................... 361/642; 174/45 R; 361/643
[58] Field of Search ........................ 174/45 R, 50, 174/59; 361/622–626, 641–643, 823–824, 827, 833–837

[56] References Cited

U.S. PATENT DOCUMENTS

| | | | |
|---|---|---|---|
| 292,848 | 2/1886 | Patterson | 361/827 |
| 1,351,043 | 8/1920 | Krier | 361/642 |
| 2,117,945 | 5/1938 | Cooper | 361/643 |
| 2,784,354 | 3/1957 | Gaubatz | 361/622 |
| 3,225,224 | 12/1965 | Rydbeck | 361/641 |
| 3,265,937 | 12/1963 | Sturdivan | 361/624 |
| 3,364,952 | 1/1968 | Scaglione et al. | 174/45 R |
| 3,808,504 | 4/1974 | Rabie | 361/610 |
| 4,914,258 | 4/1990 | Jackson | 174/45 R |

*Primary Examiner*—Gregory D. Thompson
*Attorney, Agent, or Firm*—Oltman and Flynn

[57] ABSTRACT

Remote access disconnect and fusing arrangement including an assembly having a housing with at least one wall panel; an arrangement for ducting ac-power into the housing; the ac-power including at least two non-grounded hot conductors, a disconnect arrangement in the housing connected in series with the hot conductors; a distribution terminal assembly having a plurality of input terminals each connected to a respective one of the hot conductors, and a plurality of groups of output terminals, each group of output terminals connected in parallel to a respective one of the input terminals; a plurality of current limiting elements each having an element input connected to a respective one of the output terminals and an element output; and at least one female plug connector mounted on the wall panel, having a plurality of female receive terminals, each female receive terminal connected to a respective element output. The housing can be mounted externally on a solid post, in the wall of a hollow concrete post with access openings in the hollow post walls for inserting the plug connector and/or accessing the interior of the housing.

2 Claims, 3 Drawing Sheets

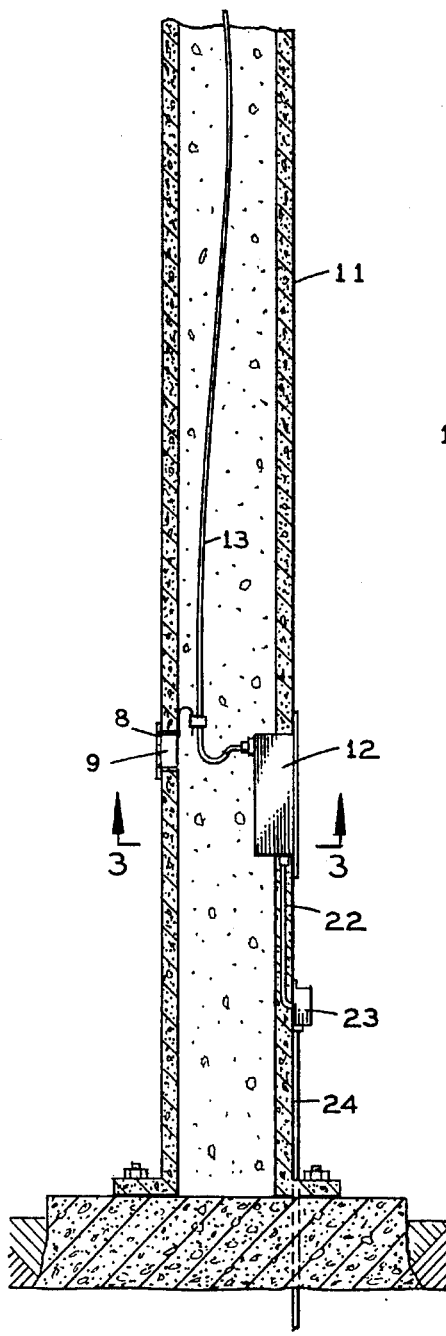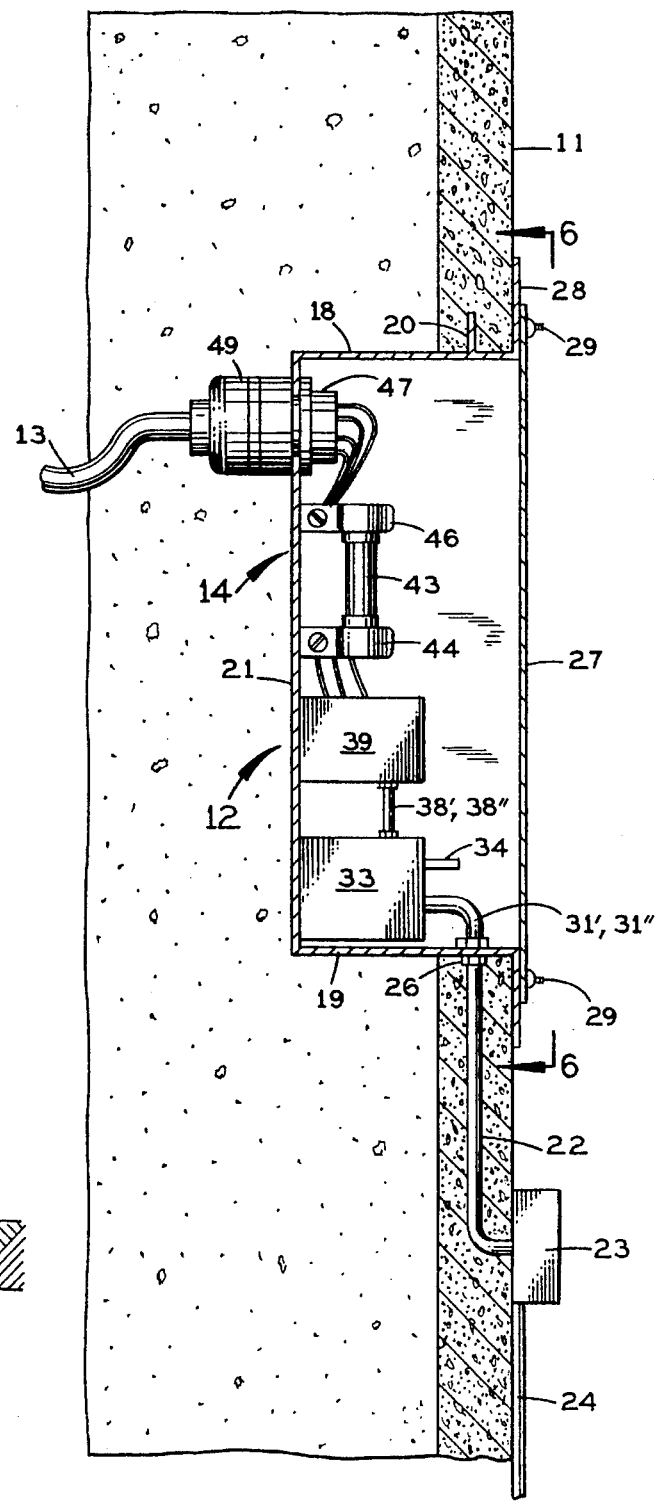
FIG. 1
FIG. 2

5,550,708

REMOTE ACCESS DISCONNECT AND FUSING ARRANGEMENT

This application is a continuation-in-part of Ser. No. 08/001,502 filed Jan. 6, 1993 now abandoned.

The invention relates to an arrangement for accessing power wiring for post mounted light fixtures, and for fusing and disconnecting individual conductors in the power wiring, and in particular for accessing such power wiring from a location that is easily reached from ground level.

BACKGROUND AND PRIOR ART

It is common practice to mount large lighting luminaries composed of several light elements on tall posts that can illuminate extensive areas such as sports arenas, large road intersections and the like. Whenever such light fixtures require service it is usually necessary for a service person to either climb up the post to reach the individual parts of the luminary, or be raised to the top of the post in a hydraulically operated person lifter, also known as a "cherry picker", mounted on a truck. Often times the only service needed is that of replacing a blown fuse or resetting or replacing a faulty circuit breaker, and often it is convenient to be able to access the power wiring to the individual light elements for the purpose of testing the wiring, or testing the associated ballast normally used with such light elements, without the need for dispatching a truck with a cherry picker.

It is accordingly the object of the instant invention to provide means for enabling a service person to access the power wiring and the associated circuit fuses or breakers from ground level or from a point near enough to ground level that it can be reached from a short ladder or the like.

SUMMARY OF THE INVENTION

In accordance with the invention there is provided a remote access disconnect and fusing arrangement including an assembly with a housing having two side panels, a back panel a top and a bottom panel; means for ducting ac-power means into the housing; the ac-power means including at least two non-grounded hot conductors, disconnect means in the housing connected in series with the hot conductors; a distribution terminal assembly having a plurality of distribution terminal assembly input terminals each connected to a respective hot wire, and a plurality of distribution terminal assembly output terminals, each group of distribution terminal assembly output terminals connected in parallel to a respective one of the distribution terminal assembly input terminals; a plurality of current limiting elements each having an element input connected to a respective one of the distribution terminal assembly output terminals and an element output; and at least one female plug connector mounted on the wall or top panel, having a plurality of female receive terminals, each female receive terminal connected to a respective current limiting element output.

According to a further feature there is provided in the ducting means a weatherproof flexible conduit attached to the housing, and included in the disconnect means a plurality of first circuit breakers, each connected in series with a respective hot conductor, and wherein the circuit breakers are ganged together.

According to a further feature, at least one of the current limiting elements is a secondary circuit breaker, or at least one of the current limiting elements is a fuse.

In the arrangement according to the invention, a fuse mounting arrangement is provided, wherein a pair of fuse mounting terminals is provided on the fuse mounting arrangement for mounting the at least one fuse, and wherein further the pair of fuse mounting terminals is adapted to enable removal of the fuse.

According to still another feature of the invention there is provided a mounting post for mounting the assembly, wherein the post is a hollow concrete post having an interior and a cutout in the post for receiving the housing, and further including an aperture in the post opposite the cutout for manually reaching the housing across the interior of the hollow post.

The hollow post is advantageously made of poured concrete, and includes an external flange on the housing, wherein the flange is cast into the poured concrete, and includes a frame conforming to the cutout, the frame adhesively attached to the post, a cover conforming to the cutout for covering the housing, and attachment means for releasably attaching the cover to the frame. Alternatively the mounting post can be a solid post, with the housing mounted externally on the post.

The housing assembly is advantageously mounted on the post at least 10 feet above the ground.

Further objects and advantages of this invention will be apparent from the following detailed description of a presently preferred embodiment which is illustrated schematically in the accompanying drawings.

BRIEF DESCRIPTION OF THE DRAWINGS

FIG. 1 is an elevational cross-sectional fragmentary view of the invention;

FIG. 2 is an elevational cross-sectional view of the invention seen along the line 2—2 of FIG. 5.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DESCRIPTION OF THE PREFERRED EMBODIMENT

Figure 3:
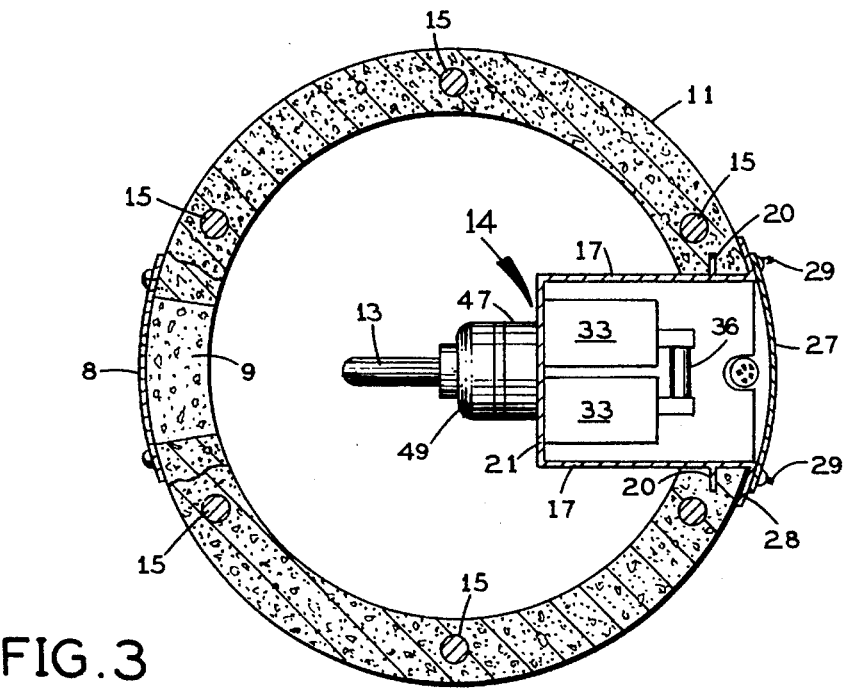
FIG. 3 is a plan cross-sectional view of the invention seen along the line 3—3 of FIG. 1 showing the invention mounted in a hollow post.

FIG. 1 shows in cross-section a hollow post 11 supporting at its top, not shown, a light assembly, for example of the type known as a cross-arm assembly with multiple high power lights, typically such as mercury arc or sodium arc lights, wherein each light requires a so-called ballast for its operation. The ballasts receive power from a remote access, disconnect and fusing arrangement 12 which, according to the invention, provide remote access to the individual lights with their ballasts via a cable 13 with power conductors feeding the individual ballasts. The post 11 is typically made of so-called spun concrete having a cross-section as shown in FIG. 3, having reinforcing steel rods or cables 15 embedded along the perimeter of the wall of the post. Alternatively, the post can be a solid concrete or wood post. In case of a hollow post, the arrangement according to the invention is advantageously mounted in a cutout in the wall of the post, as seen in FIGS. 1, 2 and 3.

The arrangement 12 is, in an especially advantageous embodiment, secured in the post wall before the concrete is poured. The components of the arrangement are installed in a housing 14 formed of wall panels that include a back panel 21, vertical side panels 17 and respective top and bottom panels 18 and 19. The top and bottom panels 18, 19 and the side panels 17 can have outstanding flanges 20 arranged so that they become embedded in the concrete as the walls are poured, and so that the housing is firmly secured to the wall of the post.

Main power to the housing is typically entered through a flexible conduit 22 (FIG. 2) embedded in a channel formed in the concrete wall 11 and terminated at the top at a connector 26 installed in the bottom panel 19 of the housing 14, and at the bottom in a junction box 23, which receives the main power conductors 31', 31" via a service conduit 24 rising for example from underground service cables.

The housing 14 is forwardly enclosed by a front panel 27 advantageously curved to conform to the contour of the wall of the post 11. The front panel 27 is secured to the post 11 by means of a conforming peripheral frame 28 and is adhesively, for example by means of epoxy cement, attached to the outer surface of the post 11. Threaded studs 29 can be welded to the frame 28 for securing the front cover 27 to the frame for weatherproof enclosing of the housing.

Figure 6:
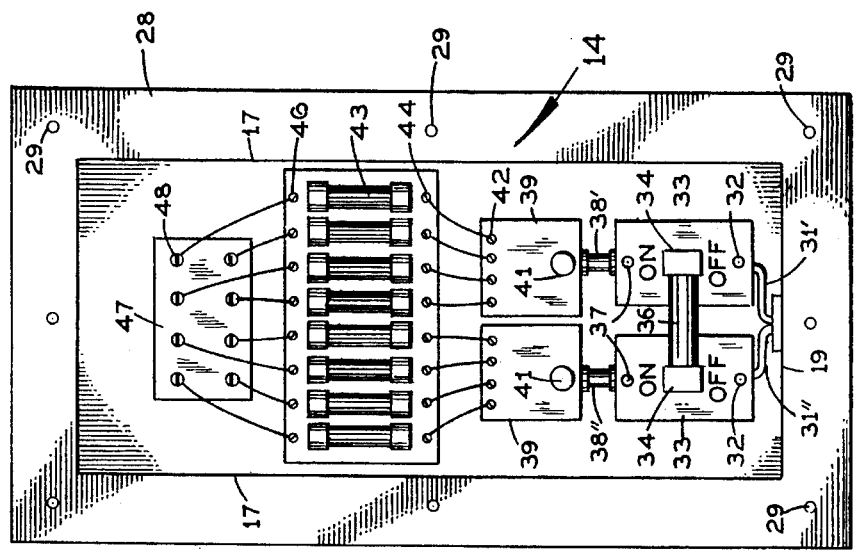
FIG. 6 is an elevational front view of the invention seen along the line 6—6 of FIG. 2 showing the interior construction of the invention.

FIG. 2 and 6 are respective side and front views of the housing 14 showing the internal components of the invention.

The number of main power conductors depends on the primary power system provided, which can be, for example, three-phase power with a common neutral conductor or it can be a two-phase power system with a common neutral. The drawings show as an example a two-phase power system having two hot power conductors 31',31" that are each protected by a circuit breaker or a fuse 33. A three-phase system would typically have three hot conductors, each requiring fusing or a circuit breaker 33.

In FIG. 6, the two hot power conductors 31' and 31" enter the housing 14 through the bottom panel 19 and are each connected to an input terminal 32 of a respective main circuit breaker 33, each equipped with a toggle 34, wherein the toggles 34 are ganged by a common link 36, that insures that primary power can be totally disconnected by throwing the toggles 34 to the "off" position of the breaker.

Instead of breakers 33, two main fuses could be provided combined with a knife switch, or the main fuses could be provided so that they can be removed with a properly adapted removal implement. The output terminals 37 of the main breakers 33 are connected by primary conductors 38', 38" to respective distribution terminal assemblies 39, each having a terminal assembly input terminal 41 for receiving a respective primary conductor 38', 38" and a plurality, e.g. four terminal assembly output terminals 42. The output terminals 42 are each connected to a secondary current limiting element 43, which can be a fuse or a secondary circuit breaker. Each secondary circuit breaker or fuse 43 has a current limiting element input terminal 44 and a current limiting element output terminal 46.

The output terminals 46 of the current limiting element are in turn each connected to a panel-mounted female part 47 of a plug-in connector having a plurality of female receive terminals 48, each connected to a respective current limiting element output terminal 46 of the secondary fuses or circuit breakers 43. FIG. 2 shows the panel mounted part 47 of the plug-in connector matingly connected with a corresponding cable mounted part 49 of the plug-in connector which is in turn connected with the cable 13 leading to the top of the post 11. The plug-in connector 47, 49 is of well-known weather resistant sealed construction known for example as a Canon® connector.

In order to provide manual access to the cable mounted part 49 of the connector, an aperture 9 (FIG. 1) is provided in the wall of the post 11, covered with a conforming cover plate 8.

Figure 5:
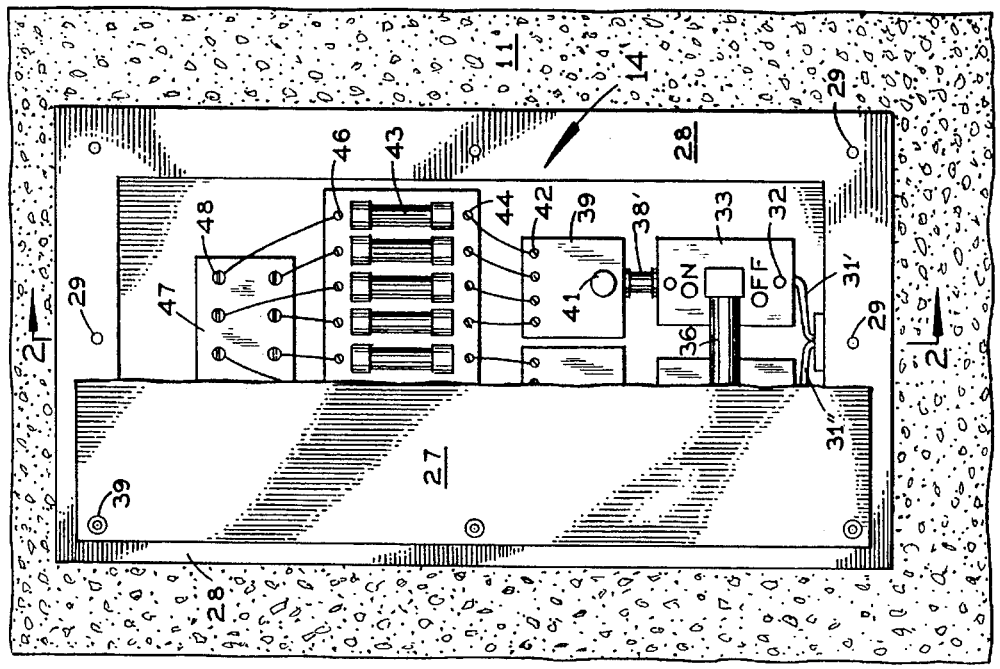
FIG. 5 is an elevational view of the invention with part of the cover removed to show part of the interior construction.

FIG. 5 is a front view of the invention showing part of the front cover 27 removed to show part of the interior components of the invention, inserted in the wall of the post 11.

Figure 4:
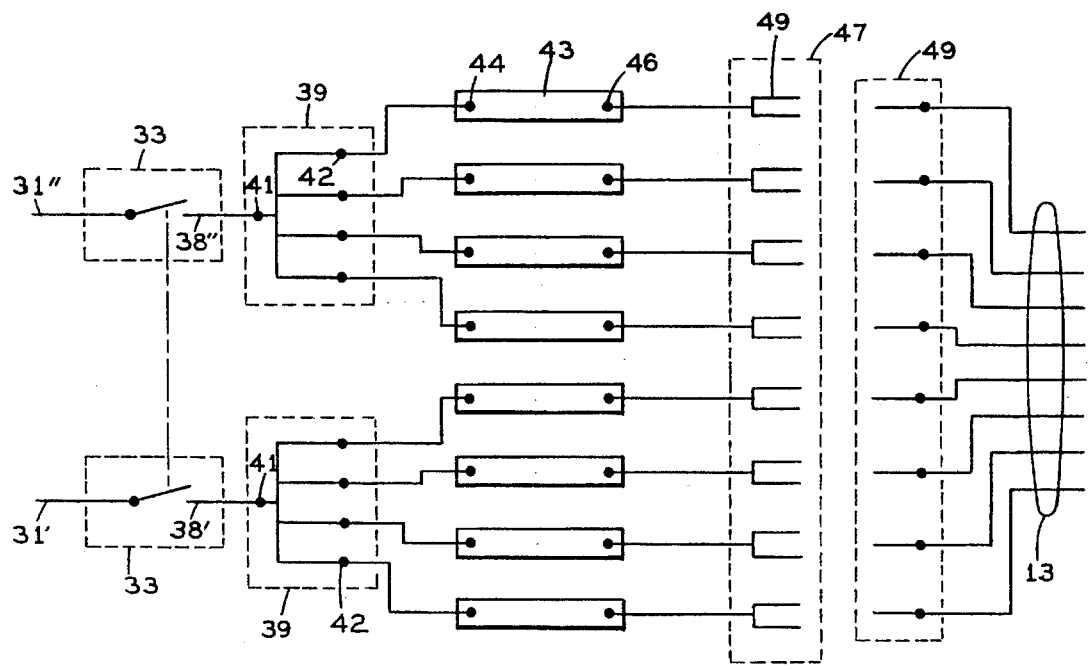
FIG. 4 is a wiring diagram of the invention.

FIG. 4 is a wiring diagram showing the electrical connections of the invention as described above. The diagram shows only the hot non-grounded conductors but not conductors such as neutral and protective grounds, which can also be present in the housing 14.

In case the post is a solid post, the housing 14 will be mounted on a suitable surface on the post with screws or bolts as would be suitable for the particular kind of post provided.

Under all circumstances the housing 14 is advantageously mounted a certain distance, e.g. 10 feet above ground, so that it is not readily accessible to a person standing on the ground.

The power cable 13 is advantageously plug-ended at each end so that it can be pre-fabricated in a shop and easily installed at the job site by simply plugging it in at each end.

I claim:

1. A remote access disconnect and fusing arrangement, the arrangement-comprising:

a mounting post extending substantially vertically from the ground for mounting said arrangement, wherein said post has a cutout for receiving said housing at a location along said post at least ten feet and at most fifty feet above the ground;

a lighhting fixture mechanically connected to said mounting post more than fifty feet above ground;

a remote fusing assembly comprising a housing recessed into said cutout and composed of a plurality of panels; ducting means for ducting ac-power means into said housing; said ac-power means including at least two non-grounded hot conductors, disconnect means in said housing connected in series with said hot conductors; a distribution terminal assembly in said housing having a plurality of terminal assembly input terminals each connected to a respective one of the hot conductors via said disconnect means, and a plurality of groups of terminal assembly output terminals, each group of terminal assembly output terminals connected in parallel to a respective one of the terminal assembly input terminals; a plurality of current limiting elements in said housing each having a current limiting element input connected to a respective one of the terminal assembly output terminals and a current limiting element output; and at least one female plug connector mounted on one of said panels, said plug connector having a plurality of female receive terminals, each female receive terminal connected to a respective current limiting element output;

and a remote extension power cable electrically connected to said lighting fixture, extending downwardly from said lighting fixture and electrically connected to said output terminals, for delivering electric power from said remote fusing assembly to said lighting fixture.

2. A remote access disconnect and fusing arrangement, the arrangement comprising:

- a mounting post extending substantially vertically from the ground for mounting said arrangement, wherein said post has a cutout for receiving said housing at a location along said post at least ten feet and at most fifty feet above the ground;
- a lighting fixture mechanically connected to said mounting post more than fifty feet above ground;
- a remote fusing assembly comprising a housing recessed into said cutout and composed of a plurality of panels; ducting means for ducting ac-power means into said housing; said ac-power means including at least two non-grounded hot conductors, disconnect means in said housing connected in series with said hot conductors; a distribution terminal assembly in said housing having a plurality of terminal assembly input terminals each connected to a respective one of the hot conductors via said disconnect means, and a plurality of groups of terminal assembly output terminals, each group of terminal assembly output terminals connected in parallel to a respective one of the terminal assembly input terminals; a plurality of current limiting elements in said housing each having a current limiting element input connected to a respective one of the terminal assembly output terminals and a current limiting element output; and at least one female plug connector mounted on one of said panels, said plug connector having a plurality of female receive terminals, each female receive terminal connected to a respective current limiting element output;
- a remote extension power cable electrically connected to said lighting fixture, extending downwardly from said lighting fixture and electrically connected to said output terminals, for delivering electric power from said remote fusing assembly to said lighting fixture;
- wherein said ducting means include a weatherproof flexible conduit attached to said housing;
- wherein said disconnect means include a plurality of first circuit breakers, each connected in series with a respective hot conductor;
- wherein said circuit breakers are ganged together;
- wherein said mounting post is a hollow post having an interior and a cutout in said post for receiving said housing, including an aperture in said post opposite said cutout for manually reaching said housing across the interior of said hollow post;
- wherein said hollow post is made of poured concrete, and including an external flange on said housing, wherein said flange is cast into said poured concrete;
- a frame conforming to said cutout, said frame adhesively attached to said post, a cover conforming to said cutout for covering said housing, and attachment means for releasably attaching said cover to said frame.

* * * * *